UNITED STATES PATENT OFFICE.

HENRY C. COLLIER, OF CLARKSVILLE, ARKANSAS.

IMPROVEMENT IN HOG-CHOLERA COMPOUNDS.

Specification forming part of Letters Patent No. 202,932, dated April 30, 1878; application filed January 22, 1878.

*To all whom it may concern:*

Be it known that I, HENRY C. COLLIER, of Clarksville, in the county of Johnson and State of Arkansas, have invented a certain new and useful Medicine for the Prevention and Treatment of Hog-Cholera; and I do hereby declare that the following is a full, clear, and exact description of the ingredients of which it is composed, of the proportion of each, and of the manner of compounding and using the same.

I take two ounces each of arsenic, powdered podophyllum, powdered poke-root, flowers of sulphur, and one ounce each of saltpeter, sulphate of copper, sulphate of iron, antimony, stramonium-seeds, and asafetida. These ingredients are finely powdered, and then intimately mixed in a druggist's mortar or otherwise, when they are placed in bottles, boxes, or other convenient packages for transportation, sale, and use.

The dose for an animal which is suffering from what is usually called "dry cholera" is about one tea-spoonful for each animal, to be given once a day for three days, and then omitted three days, until nine doses are given, or until the disease is checked. It can be given in any kind of slop or swill. After the disease is checked the above doses may be reduced one-half until all unfavorable symptoms disappear.

In case the hog has reached the secondary stage, which is usually accompanied by swelling of the throat, belly, and breast, or in case of an old or very large hog, I double the dose above prescribed.

What I claim is—

A medicine for hog-cholera compounded of arsenic, podophyllum, poke-root, flowers of sulphur, saltpeter, sulphate of copper, sulphate of iron, antimony, stramonium-seeds, and asafetida, in about the proportions named, as and for the purpose herein specified.

In testimony that I claim the foregoing as my own I affix my signature in presence of two witnesses.

HENRY C. COLLIER.

Witnesses:
JNO. G. CONNELLEY,
P. W. THOMPSON.